(12) United States Patent
Hale

(10) Patent No.: US 7,819,284 B2
(45) Date of Patent: Oct. 26, 2010

(54) METHOD AND APPARATUS FOR DISPENSING LIQUID IN A BEVERAGE BREWING MACHINE

(76) Inventor: Robert Hale, 40 Ridgetop Road, Scarborough, Ontario (CA) M1R 4G3

( * ) Notice: Subject to any disclaimer, the term of this patent is extended or adjusted under 35 U.S.C. 154(b) by 1098 days.

(21) Appl. No.: 11/350,082

(22) Filed: Feb. 9, 2006

(65) Prior Publication Data

US 2007/0181004 A1    Aug. 9, 2007

(51) Int. Cl.
*A47J 31/00* (2006.01)
(52) U.S. Cl. .......................... 222/1; 222/61; 222/146.5; 222/263; 222/373
(58) Field of Classification Search ............... 222/1, 222/53, 146.5, 263, 373, 442, 61
See application file for complete search history.

(56) References Cited

U.S. PATENT DOCUMENTS

| | | | | |
|---|---|---|---|---|
| 2,783,703 | A | * | 3/1957 | Brown ..................... 222/146.5 |
| 5,012,955 | A | * | 5/1991 | Shannon ..................... 222/61 |
| 5,083,504 | A | * | 1/1992 | Koga et al. ..................... 99/295 |
| 6,079,315 | A | | 6/2000 | Beaulieu et al. |
| 6,082,247 | A | | 7/2000 | Beaulieu |
| 6,101,835 | A | * | 8/2000 | Butsch et al. ............ 222/146.1 |
| 6,142,063 | A | | 11/2000 | Beaulieu et al. |
| 6,182,554 | B1 | | 2/2001 | Beaulieu et al. |
| 6,666,130 | B2 | | 12/2003 | Taylor et al. |
| 6,672,200 | B2 | | 1/2004 | Duffy et al. |
| 6,955,116 | B2 | | 10/2005 | Hale |
| 2004/0250686 | A1 | * | 12/2004 | Hale ........................... 99/295 |
| 2005/0126401 | A1 | * | 6/2005 | Streeter et al. ................ 99/279 |
| 2005/0173458 | A1 | * | 8/2005 | Hiranaga et al. ............ 222/263 |
| 2005/0205601 | A1 | * | 9/2005 | Taylor ......................... 222/53 |

FOREIGN PATENT DOCUMENTS

WO    WO 2005/060800 A1    7/2005

* cited by examiner

*Primary Examiner*—Kenneth Bomberg

(57) ABSTRACT

A liquid dispensing apparatus for use in a beverage brewing machine, the liquid dispensing apparatus, includes a dispensing chamber, a liquid delivery and venting arrangement in communication with an interior of the dispensing chamber for delivery of liquid thereto and for venting air therefrom, an air pump assembly in communication with the interior of the heating and dispensing chamber for pumping air into the dispensing chamber, a liquid discharge conduit in communication with the interior of the heating and dispensing chamber for discharging liquid therefrom, an end of the discharge conduit located at a predetermined level of the dispensing chamber, and a liquid pump connected to the liquid discharge conduit for pumping liquid out of the heating and dispensing chamber. During liquid dispensing, the liquid delivery and venting arrangement is closed.

17 Claims, 4 Drawing Sheets

METHOD AND APPARATUS FOR DISPENSING LIQUID IN A BEVERAGE BREWING MACHINE

FIELD OF THE INVENTION

The present invention relates to a liquid dispensing apparatus for delivery of liquid in a beverage brewing machine.

BACKGROUND OF THE INVENTION

Single serving beverage dispensing machines are very popular for providing a fresh tasting beverage in a short period of time without having to produce multiple servings. Single serving beverages are produced in beverage dispensing machines using beverage cartridges containing products such as coffee grinds, tea leaves or other soluble products.

When operating a beverage dispensing machine of this sort, a user typically loads a new cartridge into a cartridge holder located in, for example, a slide mechanism and slides the mechanism into place for brewing. Once in place, the beverage making process begins by injection of a hot or cold liquid under pressure into the cartridge, through the beverage product, and out of the cartridge into a cup or mug. While such beverage dispensing machines provide a brewed beverage in a relatively short period of time, it is still desirable to reduce that period of time to reduce waiting time and user frustration.

Referring in particular to coffee, the quality of product from such beverage brewing machines is generally considered poor by comparison to drip brewed coffee. Unfortunately, selection of higher quality coffee beans only partly addresses this problem as the brewing process itself contributes to the poor quality of coffee produced.

One of the problems is attributed to the brewing time for such brewing machines, which is often greater than 31 seconds and sometimes up in the range of 40 to 45 seconds for delivery of 10 Oz of liquid. This is a long brew time for the volume of water delivered and the volume of coffee grinds in the cartridge, causing over extraction of the coffee grinds and resulting in a bitter taste.

While brew time is one important factor, other important factors include the water pressure and control of the quantity of water delivered to the cartridge as an incorrect amount of water also negatively affects the coffee produced.

It is therefore desirable to reduce the brewing time while consistently dispensing a controlled amount of liquid at a desired pressure to the cartridge.

SUMMARY OF THE INVENTION

According to one aspect of the present invention, there is provided a liquid dispensing apparatus for use in a beverage brewing machine. The liquid dispensing apparatus includes a dispensing chamber, a liquid delivery and venting arrangement in communication with an interior of the dispensing chamber for delivery of liquid thereto and for venting air therefrom, an air pump assembly in communication with the interior of the heating and dispensing chamber for pumping air into the dispensing chamber, a liquid discharge conduit in communication with the interior of the heating and dispensing chamber for discharging liquid therefrom, an end of the discharge conduit located at a predetermined level of the dispensing chamber, and a liquid pump connected to the liquid discharge conduit for pumping liquid out of the heating and dispensing chamber. During liquid dispensing, the liquid delivery and venting arrangement is closed.

According to another aspect of the present invention, there is provided a beverage dispensing apparatus for extracting a beverage from a cartridge. The beverage dispensing apparatus includes a housing including a cartridge holder for receiving a beverage cartridge therein, an injector assembly associated with the housing and including an injector for piercing the cartridge to inject a liquid therein, an extraction mechanism cooperating with the housing and including an extractor for piercing the cartridge and extracting a beverage, a liquid dispensing apparatus, a controller for controlling the liquid dispensing apparatus during beverage brewing, and an actuator for actuating to begin the beverage dispensing. The liquid dispensing apparatus includes a heating and dispensing chamber, a liquid delivery and air venting arrangement in communication with an interior of the heating and dispensing chamber for delivery of liquid thereto and for venting air therefrom, an air pump assembly in communication with the interior of the heating and dispensing chamber for pumping air into the heating and dispensing chamber, a liquid discharge conduit in communication with the interior of the heating and dispensing chamber for discharging liquid therefrom, one end of the discharge conduit located at a predetermined level of the heating and dispensing chamber and an opposing end connected to the injector, and a liquid pump connected to the liquid discharge conduit for pumping liquid out of the heating and dispensing chamber to the injector. During beverage dispensing, the liquid delivery and air venting arrangement is closed while the air pump assembly pumps air into the chamber and the liquid pump pumps a predetermined volume of liquid from the chamber, through the injector into the cartridge and out the extractor.

According to another embodiment of the present invention, there is provided a method of dispensing liquid in a beverage brewing machine. The method includes delivering liquid to a dispensing chamber while venting air from the dispensing chamber via a liquid delivery and venting arrangement, closing the liquid delivery and venting arrangement, pumping air into an interior of the dispensing chamber, and pumping liquid from the dispensing chamber via a liquid discharge conduit located a predetermined level of the dispensing chamber.

Advantageously, air is pumped into the dispensing chamber and water is pumped out. Thus, the air provides a slight back pressure that increases the flow of water during pumping of the water out of the chamber to an injector in a cartridge. Brewing time is reduced while consistently providing a controlled amount of liquid at a desired pressure to a cartridge during brewing. In one aspect, the liquid pump is a pulsating pump. Thus, liquid is pumped by air assisted pulsating pumping of the liquid to obtain greater volume of liquid flow during pumping.

In a particular embodiment, the air pump continues to blow and the liquid pump continues to pump after liquid is dispensed to purge the conduit between the dispensing chamber and the cartridge. Further, the contents of the cartridge are partially dried by the air flow. In another particular embodiment, the water is drained from the tank during dispensing, thereby purging the tank.

BRIEF DESCRIPTION OF THE DRAWINGS

The present invention will be better understood with reference to the drawings and to the following description, in which.

DETAILED DESCRIPTION OF THE PREFERRED EMBODIMENT

Figure 1:
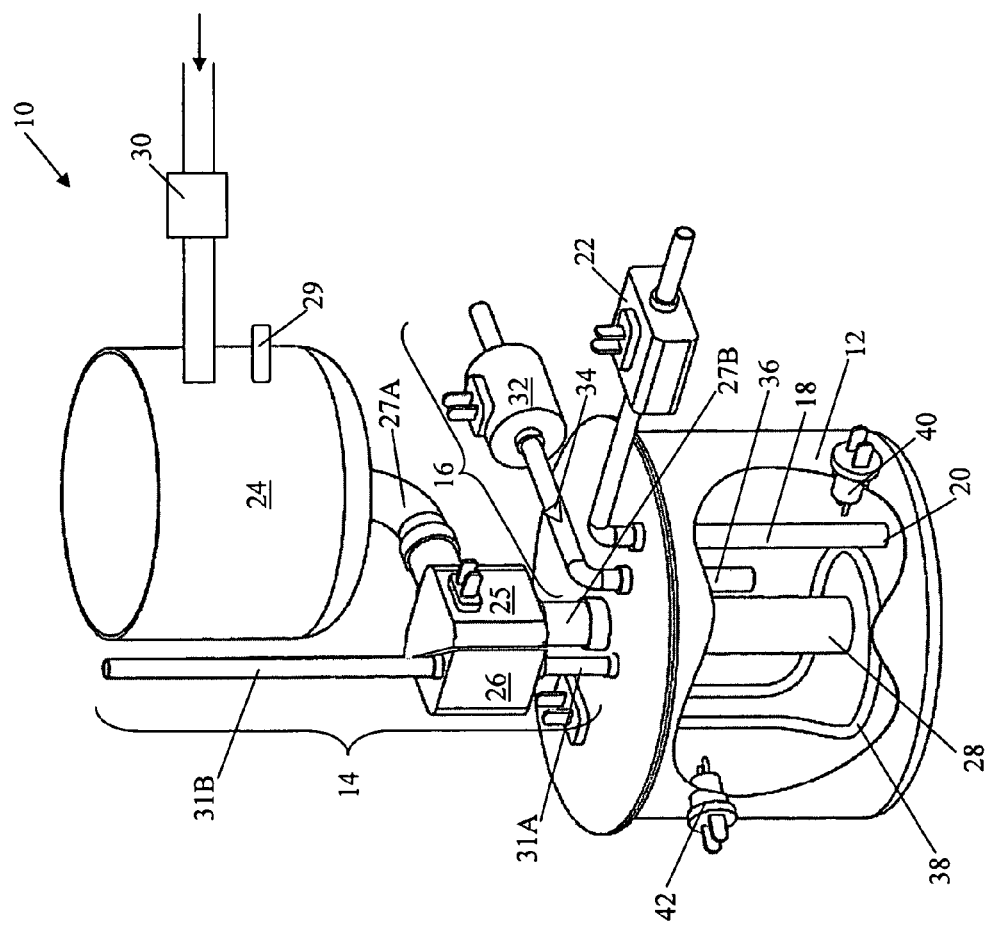
FIG. 1 is a perspective view of a liquid dispensing apparatus according to one embodiment of the present invention, the liquid dispensing apparatus including a heating and dispensing chamber shown with a portion cut away.

Referring first to FIG. 1, there is shown a liquid dispensing apparatus for use in a beverage brewing machine, the liquid dispensing apparatus indicated generally by the numeral 10. The liquid dispensing apparatus 10 includes a heating and dispensing chamber 12. A liquid delivery and air venting arrangement 14 is in communication with an interior of the heating and dispensing chamber 12 for delivery of liquid thereto and for venting air therefrom. An air pump assembly 16 is in communication with the interior of the heating and dispensing chamber 12 for pumping air into the heating and dispensing chamber 12. A liquid discharge conduit 18 is in communication with the interior of the heating and dispensing chamber 12 for discharging liquid therefrom and an end 20 of the discharge conduit is located at a predetermined level of the heating and dispensing chamber 12. A liquid pump 22 is connected to the liquid discharge conduit 18 for pumping liquid out of the heating and dispensing chamber 12. During liquid dispensing, the liquid delivery and air venting arrangement 14 is substantially sealed while the air pump assembly 16 pumps air into the heating and dispensing chamber 12 and the liquid pump 22 pumps a predetermined volume of liquid from the heating and dispensing chamber 12.

The liquid dispensing apparatus 10 will now be described in more detail with continued reference to FIG. 1. As indicated above, the liquid dispensing apparatus includes the heating and dispensing chamber 12. The heating and dispensing chamber 12 includes several ports through which conduits extend for delivery of air and water to and from the interior of the chamber 12 and for monitoring temperature within the chamber 12.

The liquid delivery and air venting arrangement 14 includes a storage tank 24 that is located above the heating and dispensing chamber 12 for gravity feeding liquid from the storage tank 24 to the heating and dispensing chamber 12. The storage tank 24 is generally cylindrically shaped and has an open top and a drain in the bottom. A length of tubing 27A joins the drain in the bottom of the storage tank 24 to a solenoid valve 25 and a second length of tubing 27B joins the solenoid valve 25 to a water supply tube 28 that extends through one of the ports and into the heating and dispensing chamber 12. Clearly, the length of tubing 27A from the drain in the storage tank 24 to the solenoid valve 25, the length of tubing 27B from the solenoid valve 25 to the water supply tube 28, and the water supply tube 28 form a conduit for liquid flow from the storage tank 24 to the heating and dispensing chamber 12. The solenoid valve 25 is normally open to allow water flow from the storage tank 24 to the heating and dispensing chamber 12. It will be appreciated that liquid is gravity fed from the storage tank 24 to the heating and dispensing chamber 12 through the solenoid valve 25.

The storage tank 24 receives water from, for example, a pipe connected to a city or other water supply. A water level sensor 29 is included to maintain a desired water level in the storage tank 24. Thus, when water flows from the storage tank 24 to the heating and dispensing chamber 12 while the solenoid valve 25 is open (and the solenoid valve 26 is open, as explained further below), the water level in the storage tank 24 drops to a low water level and a valve 30 opens to allow water from the city water supply into the storage tank 24 until the storage tank 24 is filled to the desired water level. The details of the water level sensor 29 and valve 30 for maintaining a desired water level in the storage tank 24 are well within the grasp of one skilled in the art and need not be further described herein.

Also included in the liquid delivery and air venting arrangement 14 is an air vent tube 31A that extends upwardly from a port in the top of the heating and dispensing chamber 12 and connects to a second solenoid valve 26 which is normally open. A second vent tube 31B extends from the solenoid valve 26 and upwardly to at least or greater than a maximum height of water in the storage tank 24 for venting the air. Clearly, the air vent tube 31A that extends from the port in the top of the heating and dispensing chamber 12 to the solenoid valve 26 and the second vent tube 31B that extends upwardly from the solenoid valve 26, form a conduit for venting air from the heating and dispensing chamber 12 when supplying water from the storage tank 24 and during heating of the water in the heating and dispensing chamber 12. It will be appreciated that air is vented from the heating and dispensing chamber 12 through the solenoid valve 26 for controlling air venting.

The air pump assembly 16 includes a DC air pump 32 that is connected by tubing to an intermediary one-way valve 34 and from the one-way valve 34 to an air delivery tube 36 that extends through another port in the top of the heating and dispensing chamber 12. While air is delivered from the air pump 32, to the air delivery tube 36, backflow of air is inhibited by the one-way valve 34. The voltage to the DC air pump 32 is controlled thereby regulating the pump speed for controlling the volume of air delivered over a given period of time to the heating and dispensing chamber 12 to thereby aid in controlling the pressure or speed of the volume of liquid delivered from the liquid dispensing apparatus 10.

The liquid discharge conduit 18 extends from still another port in the top of the heating and dispensing chamber 12 to an end 20 located at an adjustable, predetermined level within the heating and dispensing chamber 12. A length of tubing connects the discharge conduit 18 to the liquid pump 22 for pumping liquid from the interior of the heating and dispensing chamber 12 to an injector of the beverage brewing machine. It will be understood that the level to which the end 20 of the liquid discharge conduit 18 extends is adjustable and is determined based on a number of factors including the size and shape of the heating and dispensing chamber 12, the volume of water in the heating and dispensing chamber 12 and the volume of water dispensed. In the present embodiment, the liquid pump 22 is a solenoid pump to provide a pulsating pumping action.

A heating element 38 extends from a connector at the top of the heating and dispensing chamber 12, to a level proximal the base at the interior of the heating and dispensing chamber 12 where it heats the liquid when in use. A temperature sensor 40 extends through a port in the sidewall to an interior of the heating and dispensing chamber 12 for monitoring the temperature of the liquid and for controlling the heating element 38 through the use of a controller 44 (see FIG. 2). A safety temperature sensor 42 is also attached to the side of the heating and dispensing chamber 12 for monitoring temperature and shutting off the liquid dispensing apparatus 10 if the temperature rises to a predetermined safety level.

Figure 2:
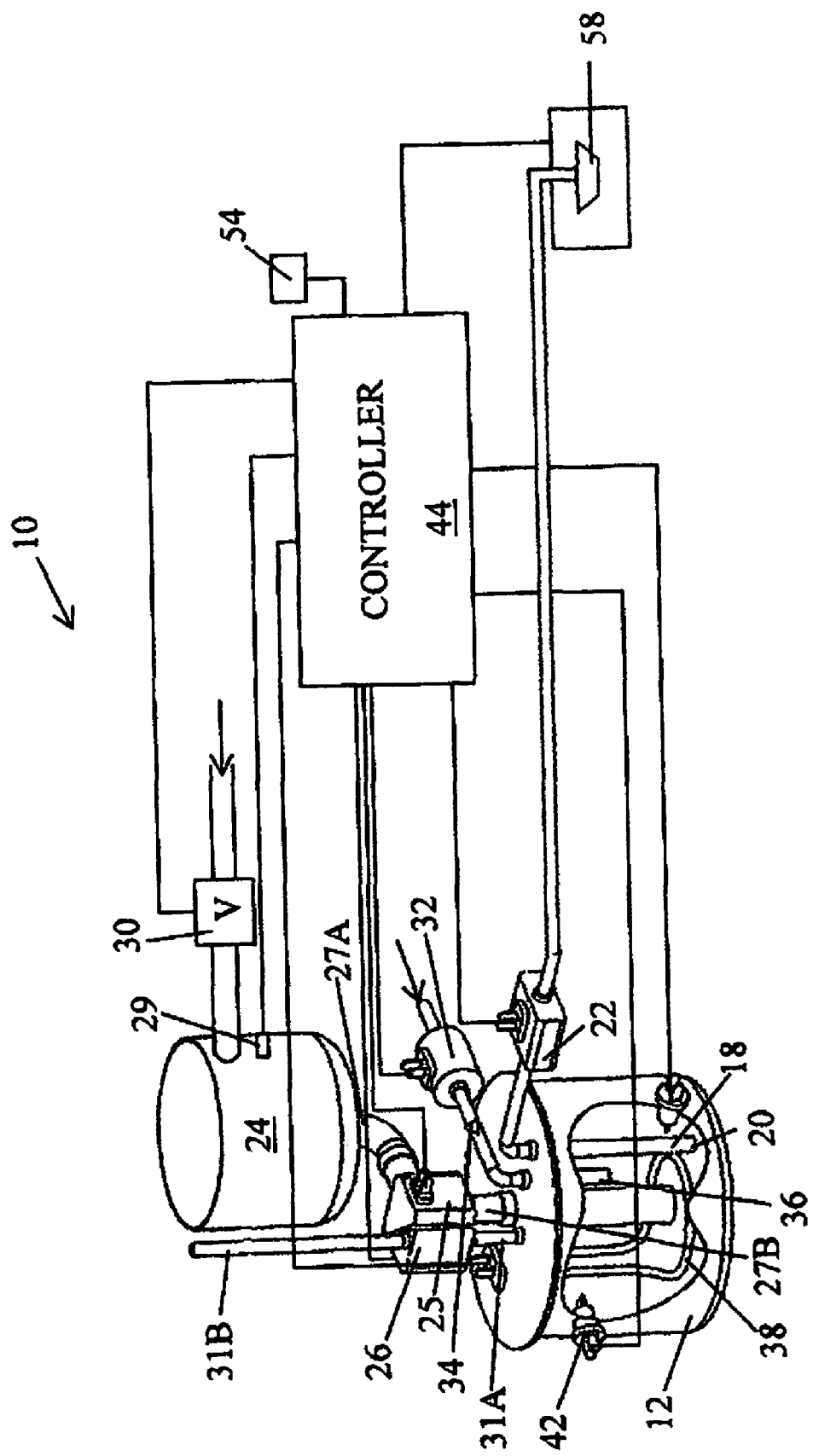
FIG. 2 is a schematic view of the liquid dispensing apparatus including a controller.

Referring now to FIG. 2, there is shown a schematic view of the liquid dispensing apparatus 10 including the controller 44. The controller 44 is connected to and controls each of the valve 30, the water level sensor 29, the solenoid valves 25, 26, the air pump 32, the liquid pump 22 and the heating element 38. The controller 44 also receives input from each of the temperature sensor 40, the safety temperature sensor 42 and a sensor in the cartridge holder portion of the housing that senses that a cartridge 58 is in place and the housing is in a closed position. It will be understood that the controller 44 is connected to the valve 30 in the pipe supplying water to the storage tank 24 and to the water level sensor 29 in the storage tank 24 for controlling the supply of water to the storage tank 24. Similarly, the controller 44 is connected to the solenoid valve 25 and the solenoid valve 26 for closing the liquid delivery and air venting arrangement 14. The air pump 32 and the liquid pump 22 are connected to the controller 22 for controlling the delivery of liquid to the injector and the heating element 38 and temperature sensor 40 are connected to the controller 22 for controlling the temperature to which the water in the heating and dispensing chamber is heated.

For delivery of heated liquid to an injector of the beverage brewing machine, the solenoid valve 25 and solenoid valve 26 remain open to allow liquid to flow from the storage tank 24 into the heating and dispensing chamber 12 while air is vented out through the air vent tube 31A and the second vent tube 31B. Clearly, the heating and dispensing chamber 12 fills with liquid resulting in a liquid level in the heating and dispensing chamber 12 that is above the end 20 of the liquid discharge conduit 18. The difference between the level of liquid in the heating and dispensing chamber 12 (which is filled with liquid) and the level to which the end 20 of the liquid discharge conduit 18 extends defines the volume of liquid dispensed during beverage brewing.

Figure 3:
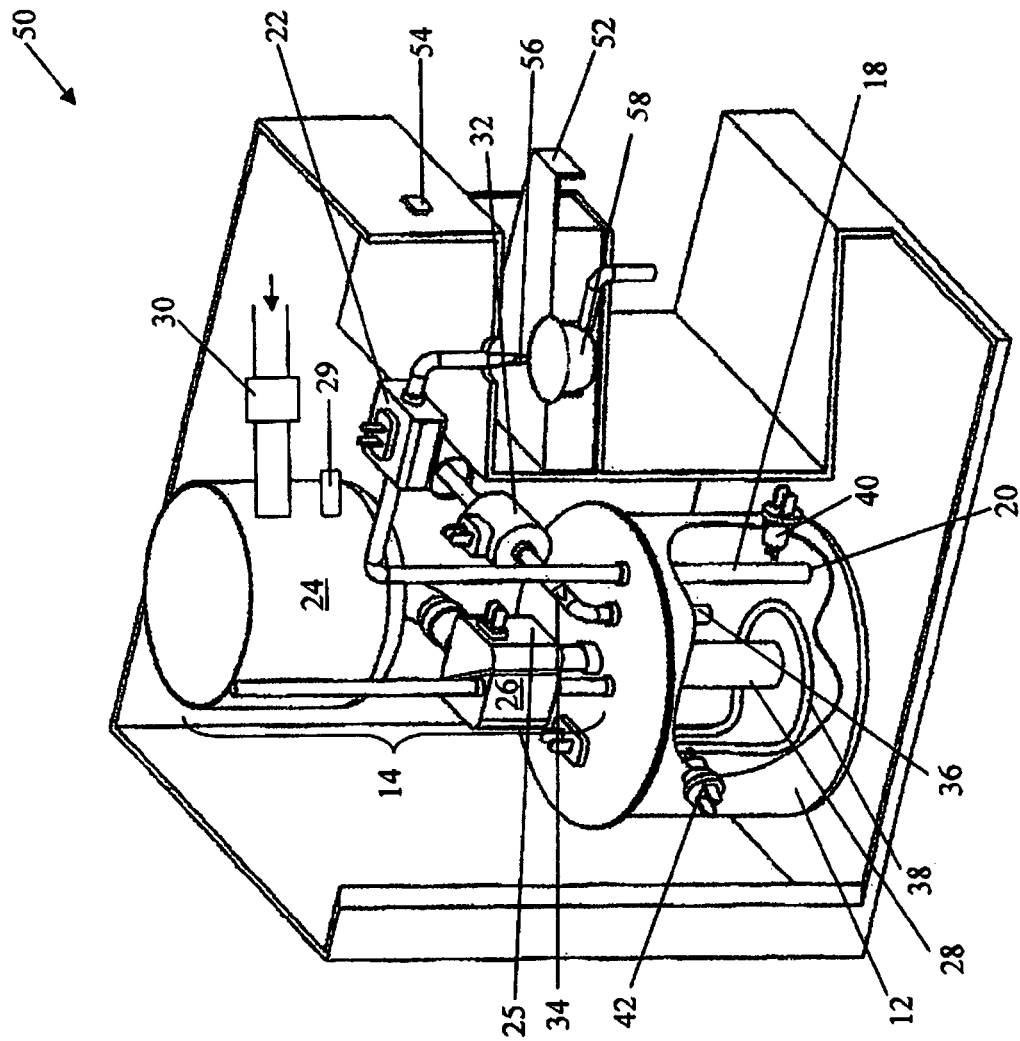
FIG. 3 is a simplified perspective view of a beverage brewing machine including the liquid dispensing apparatus of FIG. 1.

Referring to FIG. 3, there is shown a simplified perspective view of the beverage brewing machine 50 including the liquid dispensing apparatus 10. The controller as well as other parts of the beverage brewing machine 50 are not shown in FIG. 3 for the purpose of simplicity. With a cartridge 58 in the beverage brewing machine 50 and the housing 52 closed, the solenoid valves 25, 26 are in the open position and thus the lengths of tubing 27A, 27B supplying water to the heating and dispensing chamber 12 and the air vent tubes 31A, 318 are open. When the heating element 38 is turned on, the liquid in the heating and dispensing chamber 12 is heated to a set predetermined temperature which is then maintained by the controller 44 (FIG. 2) by turning the heating element 38 on and off as necessary. When the predetermined temperature is reached, a button actuator 54 on the beverage brewing machine is operable to be depressed to begin beverage brewing. Prior to reaching the predetermined temperature in the heating and dispensing chamber 12, the button actuator 54 is not operable to begin beverage brewing. Upon depression of the actuator 54, the liquid delivery and air venting arrangement 14 closes as both solenoid valves 25, 26 close, substantially sealing the heating and dispensing chamber 12. Next, the air pump 32 and liquid pump 22 simultaneously pump. As previously indicated, the liquid pump 22 causes a pulsating action which is believed to enhance the extraction process. Thus, the air pump 32 delivers air to the heating and dispensing chamber 12 while the liquid pump 22 pumps liquid from the heating and dispensing chamber 12 to the injector 56. It will be appreciated that the one way valve 34 inhibits back flow of liquid to the air pump 32. Both the air pump 32 and the liquid pump 22 remain on for a predetermined time, causing the water level in the heating and dispensing chamber 12 to drop to the level of the end 22 of the liquid discharge conduit 18 while water is delivered to the injector 56 and then delivering air from the heating and dispensing chamber 12 through the liquid pump 22 to the injector 56. Thus, air flows to purge the lengths of tubing connecting the liquid pump 22 to the discharge conduit 18 and to the injector. Air also flows over the cartridge 58 to assist in drying the cartridge contents.

Figure 4:
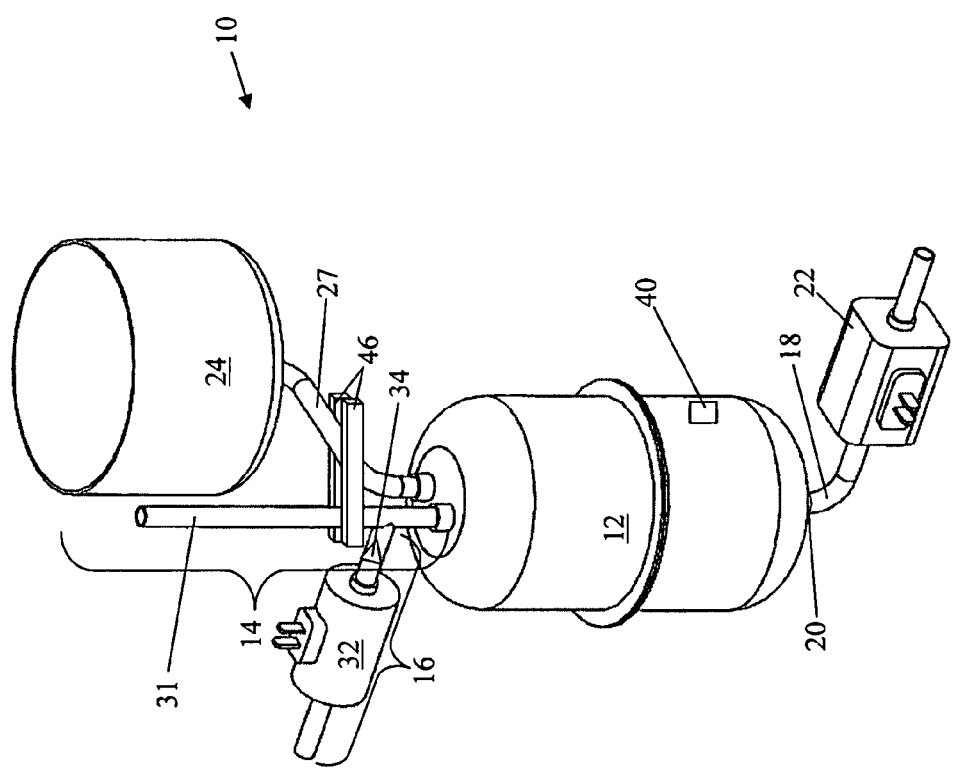
FIG. 4 is a perspective view of a liquid dispensing apparatus according to another embodiment of the present invention.

Reference is now made to FIG. 4 to describe a second embodiment of the liquid dispensing apparatus. It will be appreciated that many of the features of the embodiment shown in FIG. 4 are similar to the features shown in FIG. 1 and accordingly, similar numerals are used to denote similar features.

As in the first described embodiment, the liquid delivery and air venting arrangement 14 includes a storage tank 24 that is located above the heating and dispensing chamber 12 for gravity feeding liquid from the storage tank 24 to the heating and dispensing chamber 12. The storage tank 24 is generally cylindrically shaped and has an open top and a drain in the bottom. A length of tubing 27 joins the drain in the bottom of the storage tank 24 to the heating and dispensing chamber 12. In the present embodiment, there is no solenoid valve as described above with reference to numerals 25 and 26 in FIG. 1. Instead, a mechanical clamp 46 is used to pinch the tubing 27, to thereby close the conduit from the storage tank 24 to the heating and dispensing chamber 12. In the present embodiment, the mechanical clamp 46 is open when the housing of the beverage dispensing machine is open to insert a cartridge and the mechanical clamp 46 is closed thereby pinching the tubing 27 when the housing is closed.

In the present embodiment, the storage tank 24 is open to receive water deposited therein, from, for example, a person dumping water in from a cup or mug. When the housing is open to insert a cartridge, the water dumped in the storage tank 24 is fed by gravity into the heating and dispensing chamber 12. After water is fed from the storage tank 24 to the heating and dispensing chamber 12 and, the housing is closed, thereby mechanically closing the tubing 27.

Also included in the liquid delivery and air venting arrangement 14 is an air vent tube 31 that extends upwardly from a port in the top of the heating and dispensing chamber 12 to at least the maximum height of liquid in the storage tank 24. In the present embodiment, the air vent tube 31 does not connect through any solenoid valve 26. Instead, the air vent tube 31 also passes through the mechanical clamp 46. Thus, when the mechanical clamp 46 is open, water is permitted to flow from the storage tank 24 to the heating and dispensing chamber 12 while air is vented out the air vent tube 31. When the housing is closed, the air vent tube 31, similar to the tubing 27, is closed as it is pinched by the mechanical clamp 46. When the housing is open, the air vent tube 31, similar to the tubing 27, is open.

The air pump assembly 16 includes a DC air pump 32 that is connected by tubing to an intermediary one-way valve 34 and from the one-way valve 34 to the air vent tube 31. While air is delivered from the air pump 32, to the air vent tube, backflow of air and water is inhibited by the one-way valve 34. The voltage to the DC air pump 32 is controlled for controlling the volume of air delivered to the heating and dispensing chamber 12 to thereby aid in controlling the volume of liquid delivered from the liquid dispensing apparatus 10.

The liquid discharge conduit 18 in the present embodiment extends from a port in the bottom of the heating and dispensing chamber 12. In this embodiment, the end 20 of the liquid discharge conduit 18 is located at the bottom of the heating and dispensing chamber 12. Thus, the predetermined level to which the discharge conduit 18 extends is the bottom of the heating and dispensing chamber 12. The discharge conduit 18 is connected to the liquid pump 22 for pumping liquid from the interior of the heating and dispensing chamber 12 to an injector of the beverage brewing machine.

Although not shown in FIG. 4, it will be understood that a heating element extends from a connector at the top and external to the heating and dispensing chamber 12, into the interior of the heating and dispensing chamber 12 where it heats the liquid when in use. A temperature sensor 40 attaches to a port in the sidewall to an exterior of the heating and dispensing chamber 12 for monitoring the temperature of the liquid and for controlling the heating element 38 through the use of a controller 44. Although not shown, it will also be understood that a safety temperature sensor can also be attached to the side of the heating and dispensing chamber 12 for monitoring temperature and shutting off the liquid dispensing apparatus 10 if the temperature rises to a predetermined safety level.

Also similar to the first described embodiment, a controller is connected to and controls each the air pump 32, the liquid pump 22 and the heating element. The controller 44 also receives input from the temperature sensor 40 and from a sensor in the cartridge holder portion of the housing that senses that a cartridge is in place and the housing is in a closed position.

The operation of the liquid dispensing apparatus 10 is similar to that operation of the liquid dispensing apparatus of the first described embodiment and will not be described in detail. It will be noted that in the present embodiment, the air pump 32 and pulsating liquid pump 22 simultaneously pump, as the air pump 32 delivers air to the heating and dispensing chamber 12 while the liquid pump 22 pumps liquid from the heating and dispensing chamber 12 to the injector. Both the air pump 32 and the liquid pump 22 remain on for a predetermined time, causing the water level in the heating and dispensing chamber 12 to drop, expelling all of the water in the heating and dispensing chamber 12 and then delivering air from the heating and dispensing chamber 12 through the liquid pump 22 to the injector. Thus, water is purged from the heating and dispensing chamber, the discharge conduit 18, the liquid pump 22 and the tubing connected to the injector. Air also flows over the cartridge to assist in drying the cartridge contents. Further, it will be understood that all water poured into the storage tank 24 is delivered to the heating and dispensing chamber 12 prior to closing the mechanical clamp 46 (closing the housing). Thus, the amount of watered delivered is dependent on the amount of water poured into the storage tank 24 and does not exceed the volume of the heating and dispensing chamber 12.

While the embodiments described herein are directed to particular implementations of the liquid dispensing apparatus, it will be understood that modifications and variations to these embodiments are within the sphere and scope of the present application. For example, rather than using a double solenoid valve, a pair of solenoid valves can be substituted to carry out the same functions. Other modifications and variations may occur to those skilled in the art. All such modifications and variations are believed to be within the sphere and scope of the present application.

What is claimed is:

1. A method of controlling brewing by dispensing liquid in a beverage brewing machine, the method comprising the steps of:

delivering liquid from a storage tank to a dispensing chamber while venting air from said dispensing chamber via a liquid delivery and venting arrangement;

closing valves of said liquid delivery and venting arrangement;

pumping air with an air pump into an interior of said dispensing chamber, and pumping liquid with a liquid pump from said dispensing chamber via a liquid discharge conduit with one end connected to an injector and the other end located at a predetermined level in said dispensing chamber, said liquid pump being disposed between the interior of said dispensing chamber and said injector, said injector configured to pierce and deliver liquid into a cartridge; and controlling the steps of pumping air into said interior of said dispensing chamber and pumping liquid from said dispensing chamber to said injector and controlling voltage to said air pump to control the volume of air delivered to said dispensing chamber to thereby control brewing time in said cartridge.

2. The method of dispensing liquid according to claim 1, wherein said pumping liquid from said dispensing chamber is carried out at a same time as said pumping air into said interior.

3. The method of dispensing liquid according to claim 2, wherein after pumping said liquid from said dispensing chamber, air is delivered from said dispensing chamber through said liquid pump to said injector.

4. The method according to claim 2, wherein said pumping liquid from said dispensing chamber is carried out until liquid level drops below said one end of said liquid discharge conduit.

5. The method according to claim 1, comprising heating liquid in said interior of said dispensing chamber prior to said pumping air.

6. A method for controlling the quality of a brewed product by dispensing a liquid comprising the steps of:

(a) delivering a liquid to a dispensing chamber while venting air through a liquid delivery and venting channel;

(b) closing valves of said liquid delivery and venting channel;

(c) introducing air under pressure with an air pump into said dispensing chamber;

(d) employing a liquid pump to pump liquid from said dispensing chamber to an injector configured to pierce and deliver liquid to a cartridge, said liquid pump disposed between said dispensing chamber and said injector; and (e) controlling the step of pumping air to said dispensing chamber by controlling voltage to said air pump to control the volume of air delivered to said dispensing chamber and to control the pressure of the liquid to said injector to control quality of a brewed product.

7. The method of claim 6 wherein said step of employing a liquid pump is accomplished with a liquid pulsating pump.

8. The method of wherein the step of introducing air under pressure with an air pump is accomplished by connecting said air pump to said liquid delivery and venting channel.

9. The method of claim 6 wherein said air pump continues pumping air in said step of introducing air and said liquid pump continues pumping liquid in said step of employing a liquid pump until said injector is purged of liquid.

10. The method of claim 6 further comprises the step of heating liquid in said dispensing chamber before said step of introducing air under pressure with an air pump.

11. The method of claim 6 wherein said steps are controlled by a controller.

12. A method for controlling the pressure of a dispensed liquid comprising the steps of:

(a) delivering a liquid to a dispensing chamber while venting air from said dispensing chamber via a liquid delivery and venting arrangement;

(b) closing valves of said liquid delivery and venting arrangement;

(c) heating said liquid in said dispensing chamber;

(d) following said heating step, pumping air into said dispensing chamber with an air pump;

(e) following said heating step, pumping liquid from said dispensing chamber with a liquid pump to pump said liquid to an injector configured to pierce and deliver liquid into a cartridge, said liquid pump disposed between said dispensing chamber and said injector; and (f) controlling the step of pumping air into said dispensing chamber by controlling voltage to said air pump to control the volume of air delivered to said dispensing chamber and to control the pressure of the liquid and the step of pumping liquid from said dispensing chamber to control liquid pressure at said injector.

13. The method of claim 12 wherein said step of pumping liquid from said dispensing chamber is accomplished with a liquid pulsing pump.

14. The method of claim 12 wherein said step of pumping air is carried out at the same time as said step of pumping liquid.

15. The method of claim 12 wherein the step of pumping air into said dispensing chamber is accomplished by connecting said air pump to said liquid delivery and venting arrangement.

16. The method of claim 12 wherein said step of pumping air into said dispensing chamber and said step of pumping liquid from said dispensing chamber continues until said injector is purged of liquid.

17. The method of claim 12 wherein said steps are controlled by a controller.

* * * * *